United States Patent
Kim et al.

(10) Patent No.: US 9,824,494 B2
(45) Date of Patent: Nov. 21, 2017

(54) HYBRID SURFACES FOR MESH REPAIR

(71) Applicant: Adobe Systems Incorporated, San Jose, CA (US)

(72) Inventors: Byungmoon Kim, Sunnyvale, CA (US); Ondrej Stava, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 240 days.

(21) Appl. No.: 14/742,182

(22) Filed: Jun. 17, 2015

(65) Prior Publication Data

US 2016/0371891 A1     Dec. 22, 2016

(51) Int. Cl.
  *G06T 17/20*     (2006.01)

(52) U.S. Cl.
  CPC .................. *G06T 17/205* (2013.01)

(58) Field of Classification Search
  None
  See application file for complete search history.

(56) References Cited

U.S. PATENT DOCUMENTS

2014/0297014 A1   10/2014   Iverson et al.

OTHER PUBLICATIONS

Attene, et al., Polygon Mesh Repairing: An Application Perspective, ACM Computing Surveys, vol. 45, iss. 2, Article 15 (Feb. 2013).

Ju, "Robust Repair of Polygonal Models", ACM Trans. Graph., vol. 23, iss. 3, pp. 888-895 (Aug. 2004).

Lorensen, et al., "Marching Cubes: A High Resolution 3D Surface Construction Algorithm", Computer Graphics, 21(4), pp. 163-169 (Jul. 1987).

Wojtan, et al., "Deforming Meshes that Split and Merge", ACM Trans. Graph., vol. 28, iss. 3, Article 76 (Jul. 2009).

*Primary Examiner* — Michelle Chin (74) *Attorney, Agent, or Firm* — Finch & Maloney PLLC (57) ABSTRACT

Techniques are provided for repairing a polygon mesh that represents a three-dimensional surface, the repaired mesh comprising explicit regions that are preserved from the original mesh and implicit regions that are modified from the mesh repair operation. The explicit and implicit regions that comprise the hybrid surface meet along a "cut path" which can be located by identifying the elements of the volumetric grid where the implicit and explicit surfaces diverge. These elements comprise a path of marching cubes having faces that intersect the polygon elements of the explicit surface along the cut path. In certain embodiments the path between these intersections is selected so as to reduce deviation from the marching cube face and the path length. Once a preferred cut path is selected, the polygons that comprise the explicit surface are subdivided to conform to the cut path.

20 Claims, 7 Drawing Sheets

HYBRID SURFACES FOR MESH REPAIR

FIELD OF THE INVENTION

This disclosure relates generally to the field of three-dimensional computer graphics, and more specifically to computationally efficient techniques for repairing a polygon mesh that represents a three-dimensional surface, the repaired mesh comprising both explicit regions that are preserved from the original mesh, and implicit regions that are modified due to the mesh repair operation.

BACKGROUND

A polygon mesh is a collection of vertices, edges, and faces that represent the surface of a three-dimensional object. Polygon meshes are often used to represent and manipulate three-dimensional surfaces in computer graphics and solid modeling applications. They are popular because they are flexible, expressive, and well-suited to manipulation using the accelerated graphics processing hardware that modern digital computers use. The data used to generate a polygon mesh can be understood as originating from either digitization of real-world objects, or from tessellation of synthetic data produced by a computer. Digitized data may be generated using hardware such as a three-dimensional range scanner, a surface scanner, or any other suitable device capable of evaluating a physical object. Tessellated data, on the other hand, may be generated using design software that applies implicit mathematical formulations, sketch-based modeling techniques, or any other suitable mathematical abstraction. However, regardless of the data source, a polygon mesh will often include characteristics such as holes, overlapping segments, disconnected segments, and self-intersecting polygons. These characteristics, which are often referred to as "defects", can render the polygon mesh unsuitable for further processing using algorithms that, in general, may have specific quality and/or integrity requirements. For example, three-dimensional printing applications typically call for a closed mesh that is convertible to a solid model with well-defined internal and external regions. Defects such as gaps, holes, and self-intersecting polygons result in ambiguities that may cause a three-dimensional printing operation to fail. To address this challenge, a wide range of mesh repair techniques have been developed. Mesh repair can be understood as the process of modifying a polygon mesh to eliminate defects, thus satisfying the requirements of a particular application. Thus, for example, three-dimensional printing operations are often preceded by mesh repair operations. A wide range of mesh repair techniques are surveyed in Attene, et al., "Polygon Mesh Repairing: An Application Perspective", ACM Computing Surveys, 45(2), Article 15 (February 2013), hereinafter referred to as "Attene".

DETAILED DESCRIPTION

As noted above, polygon meshes often include defects such as holes, overlapping segments, disconnected segments, and self-intersecting polygons. Defects such as these are particularly likely to occur in regions with complex geometry or high levels of detail. For example, in applications where digitized data is used to generate the polygon mesh, defects such as noise, holes, and chamfered features may be caused by limitations of the measurement hardware used to obtain the digitization. On the other hand, in applications where tessellated data is used to generate the polygon mesh, defects such as non-manifoldness, gaps, and intersections may be caused by the description processes used to represent the modeled design, or in the modeling itself. While a number of mesh repair techniques have been developed to identify and repair defects in a polygon mesh, these existing mesh repair techniques suffer from a number of shortcomings. Local repair techniques, which modify the mesh only in the vicinity of a detected defect, may eliminate one defect while creating another. For example, filling a hole might introduce a new self-intersection. And the ambiguities that must be resolved when performing a local repair are difficult to resolve consistently and plausibly when evaluating only a small portion of a larger mesh. Global repair techniques, on the other hand, can degrade overall mesh quality and consume substantial processing resources, particularly when applied to larger meshes. These shortcomings represent substantial obstacles to the development of a robust yet efficient mesh repair technique.

Thus, and in accordance with certain of the embodiments disclosed herein, techniques are provided for repairing a polygon mesh that represents a three-dimensional surface, the repaired mesh comprising both explicit regions that are preserved from the original mesh, and implicit regions that are modified due to the mesh repair operation. A mesh that represents a three-dimensional surface can be understood as providing an "explicit representation" of the surface that may include a number of defects, particularly in regions having complex geometry or high levels of detail. In such embodiments, the mesh is discretized into a volumetric grid. A mesh repair operation is then performed to remove the defects and generate an "implicit representation" of the surface. In some regions, such as where no defects were present in the original mesh, the mesh repair operation will not substantially change the geometry of the original mesh. In these regions the final mesh geometry is the same as the original mesh geometry, and the discretization is not used. In other regions, such as where defects were repaired during the mesh repair operation, the discretization is updated to conform to the repaired mesh. In these repaired regions the final mesh geometry is constructed based on distance information stored within the updated volumetric grid. The result is a "hybrid surface" that comprises both explicit surface regions preserved from the original mesh and implicit surface regions modified as a result of the mesh repair operation.

The explicit and implicit regions that comprise the hybrid surface meet along a "cut path". This cut path can be located by identifying the elements of the volumetric grid where the implicit and explicit surfaces diverge. These elements can be understood as a path of marching cubes having faces that intersect the polygon elements of the explicit surface at points along the cut path. As a result, the marching cube face may also be referred to as the "cutting plane". In certain embodiments the path between these intersections is selected so as to reduce deviation from the marching cube face and the path length. Once a preferred cut path is selected, the polygons that comprise the explicit surface are subdivided to conform to the cut path. The explicit mesh is connected to the implicit mesh along the cut path. Numerous configurations and variations of such embodiments will be apparent in light of this disclosure.

A number of advantages are associated with certain of the disclosed embodiments. For example, existing mesh repair solutions convert the discretized volumetric grid into a polygon mesh across the entire surface using an implicit re-meshing technique. In this approach the final mesh is constructed using distance information stored within the volumetric grid, which causes the resolution of the output model to be limited to that of the volumetric grid. Sharp corners, edges, and fine details may be lost. In contrast, embodiments that disregard the discretization in regions without defects allows the resolution of the original mesh to be preserved in such regions. In addition to this increased output quality, limiting the areas where an implicit representation of the surface is used reduces computational demands and thus allows for faster mesh repair. A robust yet computationally efficient mesh repair technique is particularly useful in applications such as three-dimensional printing where the presence of defects can cause the printing operation to fail, and where the processing associated with mesh repair should be performed in a reasonable amount of time using a standard personal computer. These and other advantages will be apparent from the foregoing disclosure.

As used herein, the terms "mesh" and "polygon mesh" refer, addition to their respective ordinary meanings, to a collection of vertices, edges, and faces that represent the surface of a three-dimensional object. Two vertices connected by a straight line define an edge, and three vertices, connected to each other by three edges, define a triangular face, which is the simplest polygon. The faces of a polygon mesh often take the shape of triangles, quadrilaterals, or other simple complex polygons, although triangle meshes have the advantage of always comprising only planar faces, thus simplifying mesh operations. A wide range of different data structures can be used to represent a polygon mesh, wherein the efficiency of a particular data structure for a particular application depends on how the mesh is to be manipulated. One simple way of representing a triangle mesh is to enumerate each triangle as a set of three three-dimensional points, although a variety of other representations can be implemented in other embodiments.

As used herein, the term "marching cube" refers, in addition to its ordinary meaning, to a cube that intersects the surface of a polygon mesh. A polygon mesh can be extracted from a three-dimensional discrete scalar field using an algorithm that analyzes the relationship between the scalar field and the vertices of a marching cube. One algorithm for extracting a polygon mesh in this way is referred to as the marching cubes algorithm, and is described by Lorensen, et al., "Marching Cubes: A High Resolution 3D Surface Construction Algorithm", Computer Graphics, 21(4), pp. 163-169 (July 1987).

As used herein, the term "data structure" refers, in addition to its ordinary meaning, to a way of storing and organizing data in a computer accessible memory so the data can be used by an application or software module. In its simplest form, a data structure can be, for example, a set of one or more memory locations. In some cases, a data structure may be implemented as a so-called record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree or hierarchical format having a number of nodes; an object format that includes data fields, for instance similar to a record; or a combination of two or more of the foregoing. A data structure may include executable code for accessing and modifying the underlying structure and format of the data stored therein. In a more general sense, the data structure may be implemented as a data set that can store specific values without being constrained to any particular order or format. In one particular embodiment, a data structure comprises a table correlating sets of three vertices with a face that forms part of a polygon mesh. Numerous other data structure formats and applications will be apparent in light of this disclosure.

System Architecture

Figure 1:
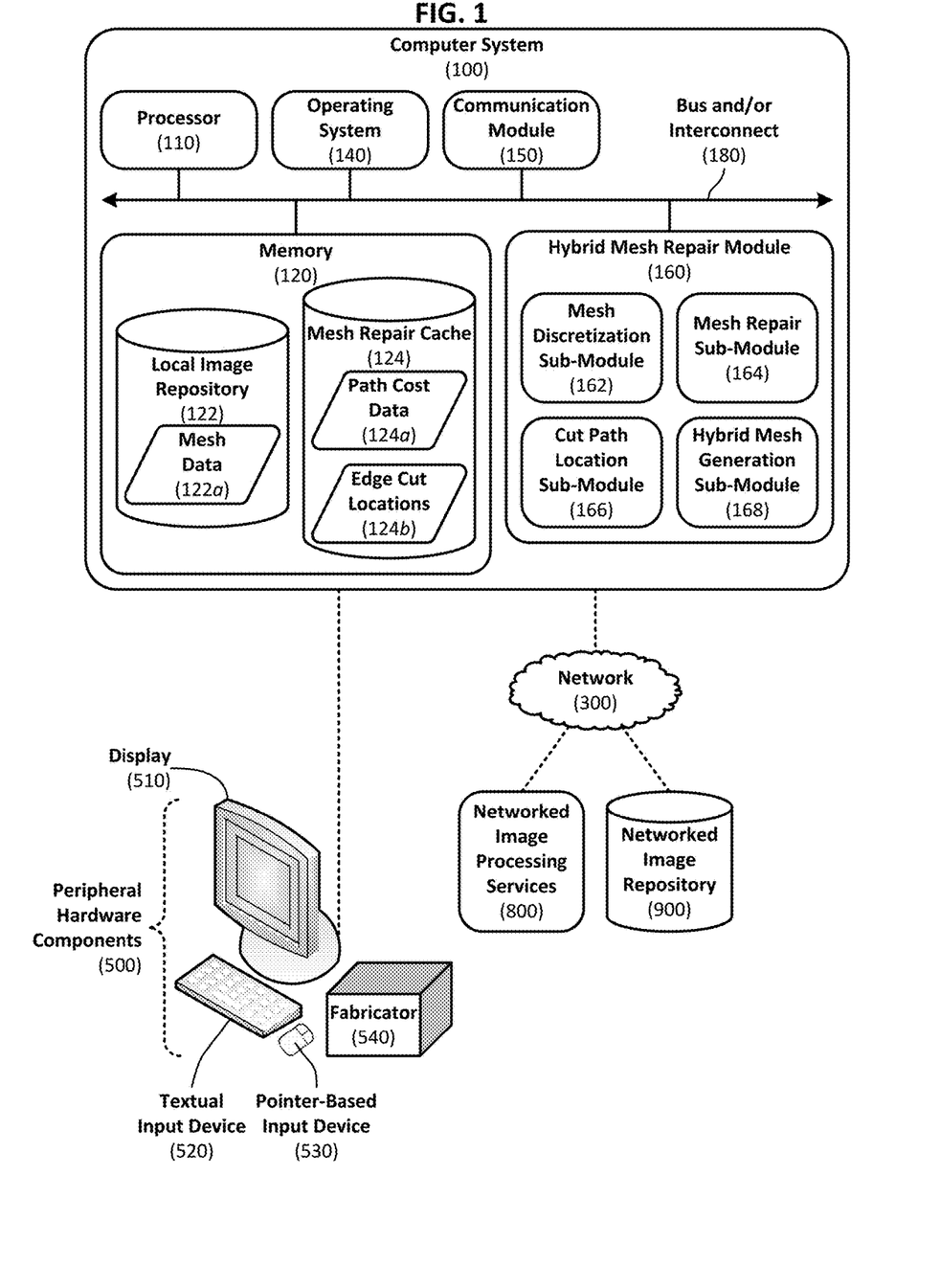
FIG. 1 is a block diagram schematically illustrating selected components of an example computer system that can be used to repair a polygon mesh that represents a three-dimensional surface.

FIG. 1 is a block diagram schematically illustrating selected components of an example of a computer system 100 that can be used to repair a polygon mesh that represents a three-dimensional surface, the repaired mesh comprising both explicit regions that are preserved from the original mesh, and implicit regions that are modified due to the mesh repair operation. Computer system 100 may comprise, for example, one or more devices selected from a desktop computer, a laptop computer, a workstation, a tablet computer, a smartphone, a handheld computer, a set-top box, an enterprise class server, or any other such computing device. A combination of different devices may be used in certain embodiments. In the illustrated embodiment, computer system 100 includes, among other things, a processor 110, a memory 120, an operating system 140, a communication module 150, and a hybrid mesh repair module 160. As can be further seen, a bus and/or interconnect 180 is also provided to allow for inter- and intra-device communications using, for example communication module 150.

Depending on the particular type of device used for implementation, computer system 100 is optionally coupled to or otherwise implemented in conjunction with one or more peripheral hardware components 500. Examples of peripheral hardware components 500 include a display 510, a textual input device 520 (such as a keyboard), a pointer-based input device 530 (such as a mouse), and a fabricator 540, such as a printer capable of fabricating a three-dimensional object (colloquially referred to as a "three-dimensional printer"), or other fabrication device. One or more other input/output devices, such as a touch sensitive display, a speaker, a conventional printer, or a microphone, can be used in other embodiments. For example, in a particular alternative embodiment wherein computer system 100 is implemented in the form of a tablet computer, functionality associated with one or more of particular peripheral hardware components 500 illustrated in FIG. 1 is provided instead by a touch sensitive surface that forms part of the tablet computer. In general, computer system 100 may be coupled to a network 300 to allow for communications with other computing devices or resources, such as networked image processing services 800 and/or a networked image repository 900. For example, leveraging networked image processing subcomponents 800 may be particularly useful for implementations wherein computer system 100 has limited processing capacity, and thus can benefit from harnessing functionality associated with a larger, more powerful computer system. Other components and functionality not reflected in the schematic block diagram of FIG. 1 will be apparent in light of this disclosure, and thus it will be appreciated that other embodiments are not limited to any particular hardware configuration.

Processor 110 can be any suitable processor, and may include one or more coprocessors or controllers, such as an audio processor or a graphics processing unit, to assist in control and processing operations associated with computer system 100. Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently developed platform. Communication module 150 can be any appropriate network chip or chipset which allows for wired and/or wireless connection to other components of computer system 100, and/or to network 300, thereby enabling computer system 100 to communicate with other local and/or remote computer systems, servers, and resources.

Memory 120 can be implemented using any suitable type of digital storage, such as one or more of a disc drive, a universal serial bus (USB) drive, flash memory, and/or random access memory. As illustrated in FIG. 1, in one implementation memory 120 comprises a local image repository 122 configured to store one or more locally stored three-dimensional images that are characterized by polygon mesh data 122a. Mesh data 122a in turn comprises one or more data structures containing data that characterizes the vertices, edges, and faces that define a three-dimensional surface. Memory 120 also optionally comprises a mesh repair cache 124 configured to store path cost data 124a and edge cut locations 124b. Path cost data 124a represents a conceptual cost associated with a cut path that connects two vertices in the face of a marching cube, the vertices located at points where a polygon mesh intersects the marching cube face. In one implementation, this conceptual cost includes components that represent (a) how much the cut path deviates from the marching cube face, and optionally (b) the length of the cut path between the two vertices. Edge cut locations 124b represent intermediate vertices along the cut path that define the cut path itself. Taken together, path cost data 124a and edge cut locations 124b characterize the cut path the defines the boundary between explicit surface regions preserved from an original mesh and implicit surface regions modified as a result of performing a mesh repair operation on the original mesh.

In an alternative embodiment, path cost data 124a and edge cut locations 124b are stored together with mesh data 122a in local image repository 122. In another alternative embodiment, such data can be stored, either together or separately, in a remote storage resource, such as in networked image repository 900 or any other suitable networked storage location. For example, in certain embodiments networked image repository 900 is implemented in the form of cloud storage. In embodiments wherein network 300 comprises a local network such as a Bluetooth or Wi-Fi connection between computer system 100 and an imaging device such as a three-dimensional scanner, networked image repository 900 comprises a memory resource provided by the imaging device itself. Furthermore, in some implementations hybrid mesh repair module 160 is configured to access both local and networked image repositories to identify polygon meshes that are to be processed as disclosed herein.

Hybrid mesh repair module 160 is configured to repair a polygon mesh that represents a three-dimensional surface, the repaired mesh comprising both explicit regions that are preserved from the original mesh, and implicit regions that are modified due to the mesh repair operation. The services provided by hybrid mesh repair module 160 can be invoked by a wide range of other software modules, including by software modules associated with digital imaging applications and three-dimensional printing applications. In other implementations such services are invoked by operating system 140 or its subcomponents, such as a printer driver. In certain embodiments hybrid mesh repair module 160 is provided to computer system 100 using an applet, such as a JavaScript applet, or other downloadable module. Such a remotely-provisioned module can be provided in real-time in response to a request from computer system 100 for access to a server having resources that are of interest to the user of computer system 100. Examples of such resources include networked image processing subcomponents 800 and/or networked image repository 900, the latter of which may include images, mesh definitions, or other digital content that the user wishes to manipulate. The server, if applicable, may be local to network 300 or may be remotely coupled to network 300 by one or more other networks or communication channels. In any such standalone or networked computing scenarios, hybrid mesh repair module 160 can be implemented with any suitable combination of technologies that allow a user to interact with computer system 100. In one particular example embodiment, hybrid mesh repair module 160 is provided by a digital image editing software application such as Adobe® Photoshop®.

As illustrated in FIG. 1, hybrid mesh repair module 160 comprises a mesh discretization sub-module 162, a mesh repair sub-module 164, a cut path location sub-module 166, and a hybrid mesh generation sub-module 168. Mesh discretization sub-module 162 is configured to generate a volumetric grid over the surface of an unprocessed polygon mesh that, in general, may contain a number of surface defects. Such an unprocessed mesh may also be referred to as an "original mesh". In one implementation the volumetric grid comprises a three-dimensional array of cubes. Each volumetric element can be characterized by a signed distance of the cube center to the nearest point on the surface of the original mesh. Mesh repair sub-module 164 is configured to remove defects in the original mesh and thereby generate an implicit representation of the original mesh surface. Any one or more of a variety of suitable mesh repair algorithms can be invoked for this purpose, including hole filling algorithms, overlap detection algorithms, and any of the techniques surveyed by Attene. In some implementations a variety of different mesh repair algorithms are applied to different regions of the polygon mesh depending on the types of defects present in a given region. In regions of the original mesh where no defects were present, mesh repair sub-module 164 will not substantially change the geometry of the original mesh. In certain implementations wherein the geometry of the original mesh is not substantially changed, any change in such geometry would not be able to be rendered perceptibly using a particular rendering device for such implementations.

Still referring to FIG. 1, cut path location sub-module 166 is configured to identify a path that separates regions where the repaired implicit representation of the original mesh surface is used from regions where the geometry of the original mesh surface is preserved. In an example embodiment, this cut path is located by identifying elements of the volumetric grid where the implicit and explicit surfaces diverge. These elements can be understood as a path of marching cubes having faces that intersect the polygon elements that comprise the original mesh. Once these marching cubes are identified, a penalty cost minimization function, referred to herein as A* cost, can be used to locate the cut path across each marching cube. In particular, the penalty cost minimization using A* can be understood as locating the cut path in a way that reduces deviation from the marching cube face. If multiple cut paths deviate from the marching cube face equally, the cut path having the minimum A* cost can be selected as the preferred cut path. Once a preferred cut path is selected, cut path location sub-module 166 is further configured to further subdivide the traversed polygons to conform to the cut path. Hybrid mesh generation sub-module 168 is configured to connect the repaired implicit representation of the original mesh surface to the original mesh surface along the cut path.

Computer system 100 can communicate with the various networked subcomponents and resources described herein via network 300. Network 300 may be a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 300 is provided by a cellular data network, thereby making it easier for users of smartphones and tablet computers to leverage networked resources. In general, communications amongst the various entities and resources described herein may occur via wired and/or wireless connections, such as may be provided by Wi-Fi or mobile data networks. In some cases access to resources on a given network or computing system may require credentials such as a username and password, and/or may require compliance with any other suitable security mechanism.

The embodiments described herein can be implemented in various forms of hardware, software, firmware, and/or special purpose processors. For example, in one embodiment a non-transitory computer readable medium has instructions encoded thereon that, when executed by one or more processors, cause one or more of the hybrid mesh repair techniques described herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, such as digital image editing software applications, word processing applications, presentation applications, file management systems, three-dimensional printing applications, and content management systems. For example, a three-dimensional graphics design software application can be configured to generate a hybrid polygon mesh suitable for three-dimensional printing, and thus can be configured to implement certain of the functionalities disclosed herein. The computer software applications disclosed herein may include any number of different modules, sub-modules, or other components of distinct functionality, and can provide information to, or receive information from, still other components and services. These modules can be used, for example, to communicate with peripheral hardware components, networked storage resources, or other external components. More generally, other components and functionalities not reflected in the illustrations will be apparent in light of this disclosure, and it will be appreciated that the present disclosure is not intended to be limited to any particular hardware or software configuration. Thus in other embodiments the components illustrated in FIG. 1 may comprise additional, fewer, or alternative subcomponents.

The aforementioned non-transitory computer readable medium may be any suitable medium for storing digital information, such as a hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and/or firmware can be used, and that the present disclosure is not intended to be limited to any particular system architecture.

Methodology

Figure 2A:
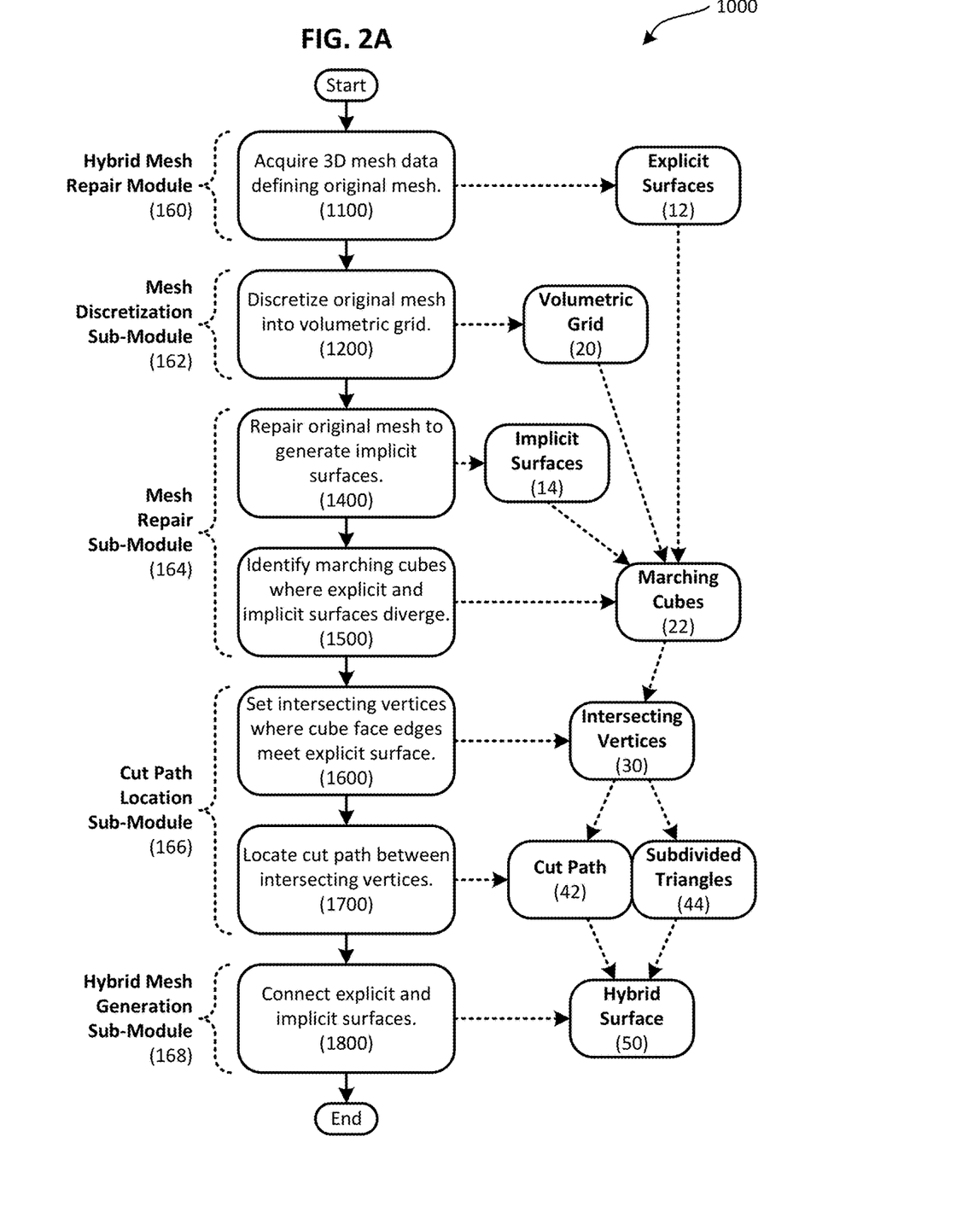
FIG. 2A is a flowchart illustrating an example mesh repair operation that produces a repaired mesh having a hybrid surface that comprises both explicit regions that are preserved from an original mesh, and implicit regions that are modified as a result of the mesh repair operation.

FIG. 2A is a flowchart illustrating an example mesh repair operation 1000 that produces a repaired mesh having a hybrid surface that comprises both explicit regions that are preserved from an original mesh, and implicit regions that are modified as a result of the mesh repair operation. As can be seen, mesh repair operation 1000 includes a number of phases and sub-processes, the sequence of which may vary from one embodiment to another. However, when considered in the aggregate, these phases and sub-processes form a complete mesh repair operation that is responsive to user input in accordance with certain of the embodiments disclosed herein. The mesh repair operation can be implemented, for example, using the system architecture illustrated in FIG. 1 and described herein. However, other system architectures can be used in other embodiments, as will be apparent in light of this disclosure. To this end, the correlation of the various functionalities illustrated in FIG. 2A to the specific components illustrated in FIG. 1 is not intended to imply any structural and/or use limitations. Rather, other embodiments may include, for example, varying degrees of integration wherein multiple functionalities are effectively performed by one system or module. For example, in an alternative embodiment a single module is used to locate a cut path and connect an explicit mesh to an implicit mesh. Thus other embodiments may have fewer or more modules depending on the granularity of implementation. Numerous variations and alternative configurations will be apparent in light of this disclosure.

As illustrated in FIG. 2A, mesh repair operation 1000 can be understood as commencing with hybrid mesh repair module 160 acquiring three-dimensional mesh data that defines an explicit mesh. See reference numeral 1100 in FIG. 2A. The explicit mesh, which is also sometimes referred to as the original mesh, comprises a plurality of explicit surfaces 12 that collectively define a three-dimensional surface. The three-dimensional mesh data can be acquired from a variety of different sources, including from local image repository 122 or from networked image repository 900. In one implementation, acquiring the three-dimensional mesh data may comprise opening a three-dimensional image in a digital image editing software application that includes the ability to manipulate and optionally print three-dimensional images. In another implementation, acquiring the three-dimensional mesh data may comprise scanning a physical object or scene with a three-dimensional scanner. However, regardless of how it is initially acquired, the mesh data can be stored in any appropriate data structure, such as a table correlating sets of vertices with polygon faces. The three-dimensional mesh data can be derived from digitized data or tessellated data, but in either case, defines an explicit mesh that includes a number of surface defects, such as noise, holes, chamfered features, non-manifoldness, gaps, and/or self-intersections. Such defects are particularly likely to occur in regions with complex geometry or high levels of detail.

Once the original mesh is acquired, mesh discretization sub-module 162 is configured to discretize the original mesh into a volumetric grid 20. See reference numeral 1200 in FIG. 2A. In one embodiment volumetric grid 20 comprises a three-dimensional array of cubes arrayed over the surface of the original mesh. In an alternative embodiment a volumetric element other than a cube is used. In general, any of a wide variety of suitable mesh discretization techniques can be used in this regard. Each volumetric element can be characterized by a signed distance of the cube center to the nearest point on the surface of the original mesh.

As noted previously, the original mesh will, in general, contain a number of surface defects. Mesh repair sub-module 164 is configured to perform a mesh repair operation to generate an implicit mesh. See reference numeral 1400 in FIG. 2A. The implicit mesh, which is also sometimes referred to as the repaired mesh, comprises a plurality of implicit surfaces 14 that collectively define a repaired surface with fewer, if any, defects. Any one or more of a variety of suitable mesh repair operations can be performed to generate the implicit mesh, examples of which include hole-filling algorithms and overlap detection algorithms. For example, a wide variety of suitable mesh repair algorithms are surveyed by Attene.

Because some regions of the original mesh may have been defect-free, such regions are not significantly changed by the mesh repair operation. In these regions the final mesh geometry should be substantially the same as the original mesh geometry, and the discretization is not used. In other regions, such as where defects were repaired during the mesh repair operation, the discretization is updated to conform to the repaired mesh. In particular, implicit re-meshing is performed on volumetric cubes that are marked as implicit by the mesh repair operation, thus resulting in an updated volumetric grid. In one embodiment, a volumetric cube is marked as implicit if it: (a) is created due to a volumetric hole-filling operation; (b) is located around intersections between two triangles of the original mesh; (c) is located along polygon edges that are connected to only a single polygon (such an edge is sometimes referred to as an "open boundary" or a "non-manifold edge"); or (d) is created as a result of thickening an input surface having a hole or having a thickness below a certain threshold thickness. In other embodiments volumetric cubes are marked as implicit based on additional, alternative, or fewer criteria. In regions defined by the volumetric cubes marked as implicit, the final mesh geometry is constructed based on the distance information stored within the updated volumetric grid. The final mesh geometry will therefore include both explicit regions with geometry preserved from the original model, and implicit regions with modified geometry based on the mesh repair operation.

After the mesh repair operation is performed, mesh repair sub-module 164 is further configured to identify marching cubes 22 that define a boundary where explicit surfaces 12 and implicit surfaces 14 diverge. See reference numeral 1500 in FIG. 2A. As noted previously, a subset of the volumetric cubes will be marked as implicit as a result of the mesh repair operation. For example, in some implementations one or more large clusters of contiguous volumetric cubes will be marked as implicit. But unless all volumetric cubes are marked as implicit, at some point certain of the cubes marked as implicit will be positioned adjacent to cubes not marked as implicit. This represents the boundary where explicit surfaces 12 and implicit surfaces 14 diverge. The volumetric cubes positioned along this boundary correspond to a series of marching cubes 22. In a given original mesh, there may exist several distinct clusters of volumetric cubes marked as implicit, each of which is associated with a boundary defining a series of marching cubes 22 separating that cluster of implicit cubes from adjacent non-implicit volumetric cubes.

Figures 3A, 3B:
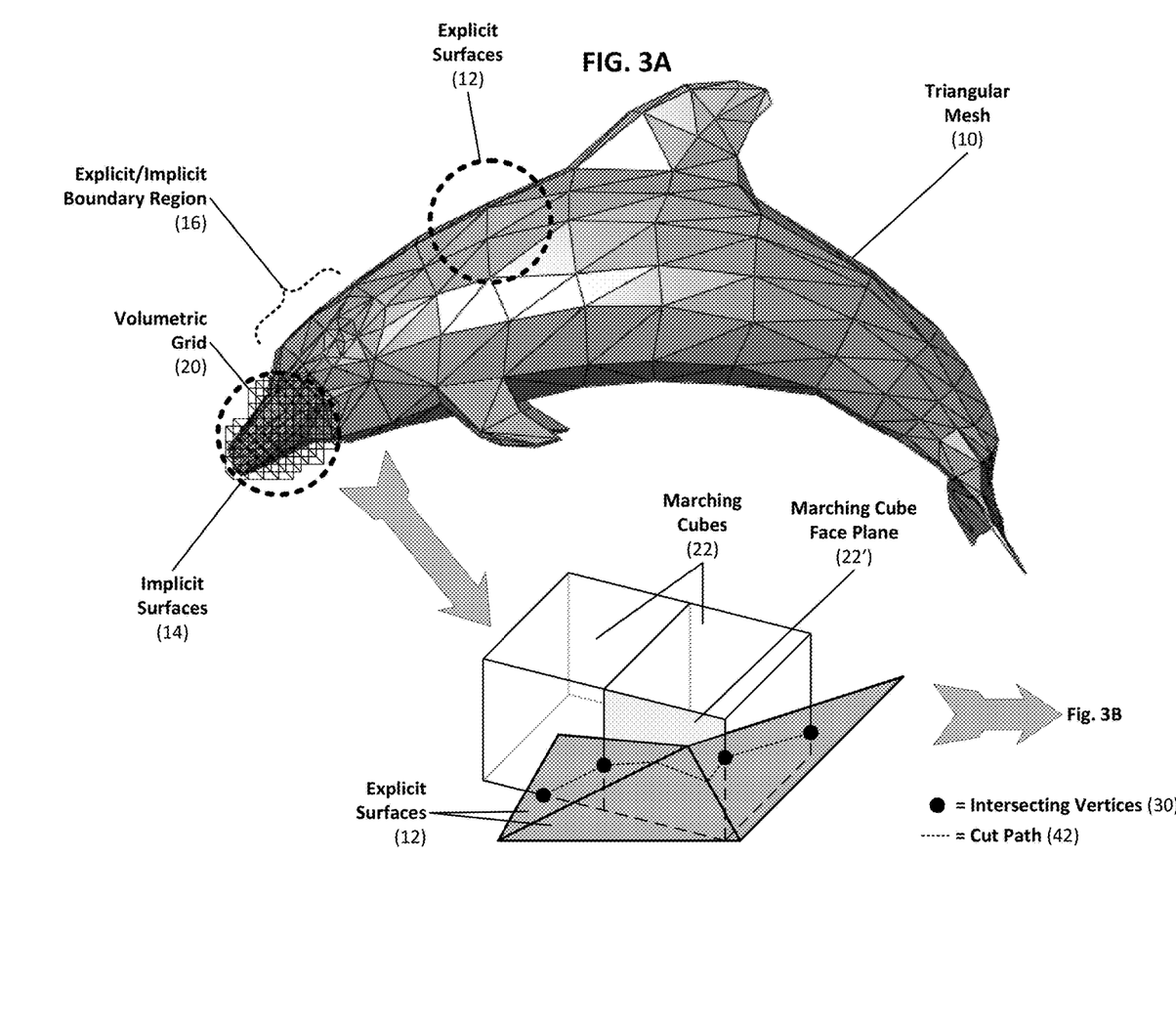
FIG. 3A schematically illustrates a plurality of marching cubes located in an explicit/implicit boundary region of an example three-dimensional triangular mesh, and further illustrates how the explicit surfaces comprising the mesh intersect identified marching cube face plane edges at intersecting vertices.
FIG. 3B schematically illustrates the results of solving a penalty cost minimization function in the context of the three-dimensional triangular mesh of FIG. 3A.
Figure 3B:
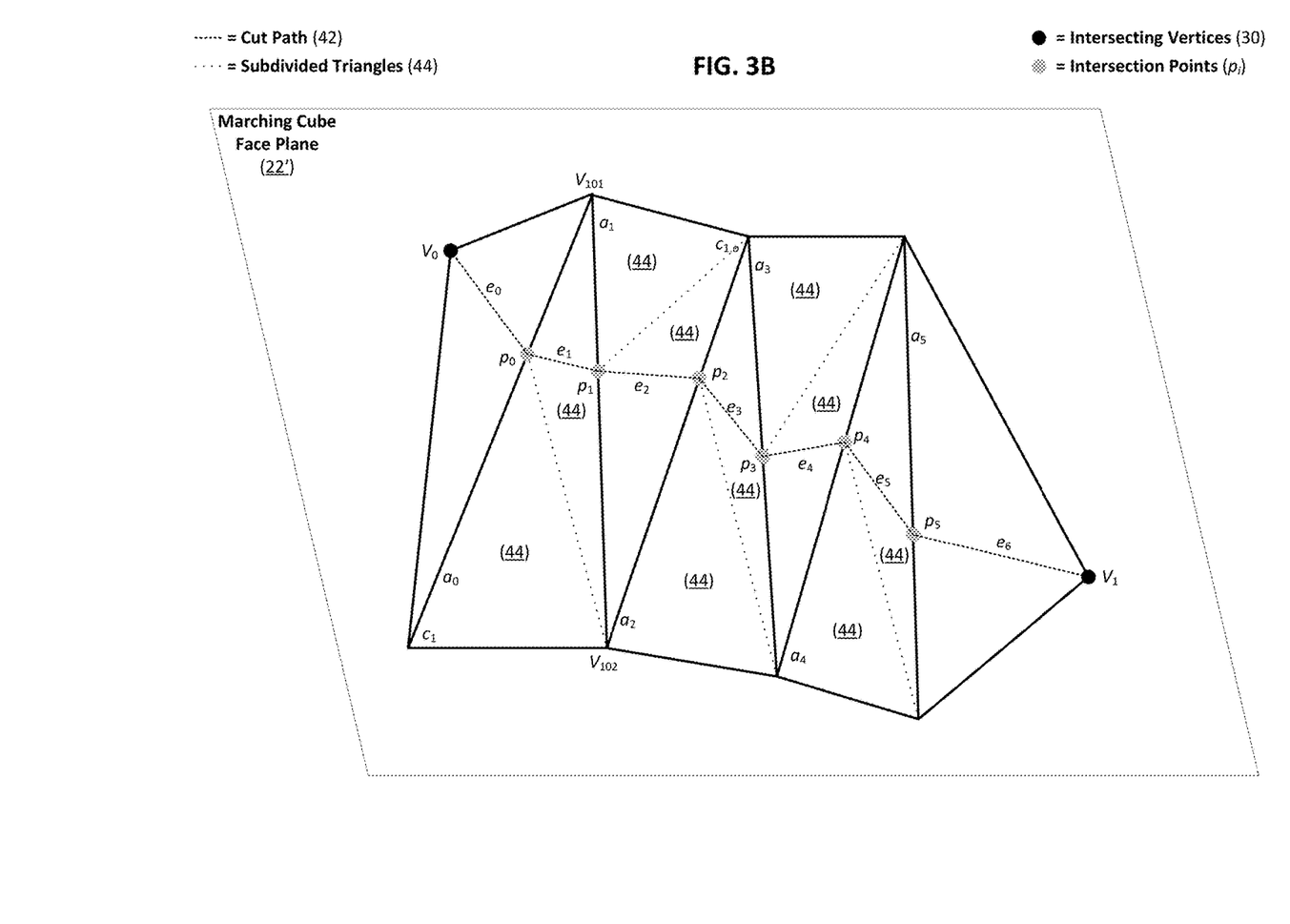

The boundary between implicit and explicit regions of a hybrid mesh can be referred to as a "cut path" because it corresponds to the path along which explicit surfaces 12 and implicit surfaces 14 are cut to correspond to each other. While marching cubes 22 can be understood as separating explicit and implicit regions in a general sense, it is possible to define this explicit/implicit boundary more precisely. To this end, cut path location sub-module 166 can be configured to set intersecting vertices 30 at the points where the edges of the marching cube faces intersect explicit surfaces 12. See reference numeral 1600 in FIG. 2A. This is more clearly understood with reference to FIG. 3A, which schematically illustrates marching cubes 22 located in an explicit/implicit boundary region 16 of an example three-dimensional triangular mesh 10. Explicit surfaces 12 comprising mesh 10 intersect identified marching cube face plane edges at intersecting vertices 30. Because marching cube face planes 22' can be understood as cutting across explicit surfaces 12, these planes are also referred to as "cutting planes". FIG. 3A also illustrates a cut path 42 extending between two intersecting vertices 30.

Figure 2B:
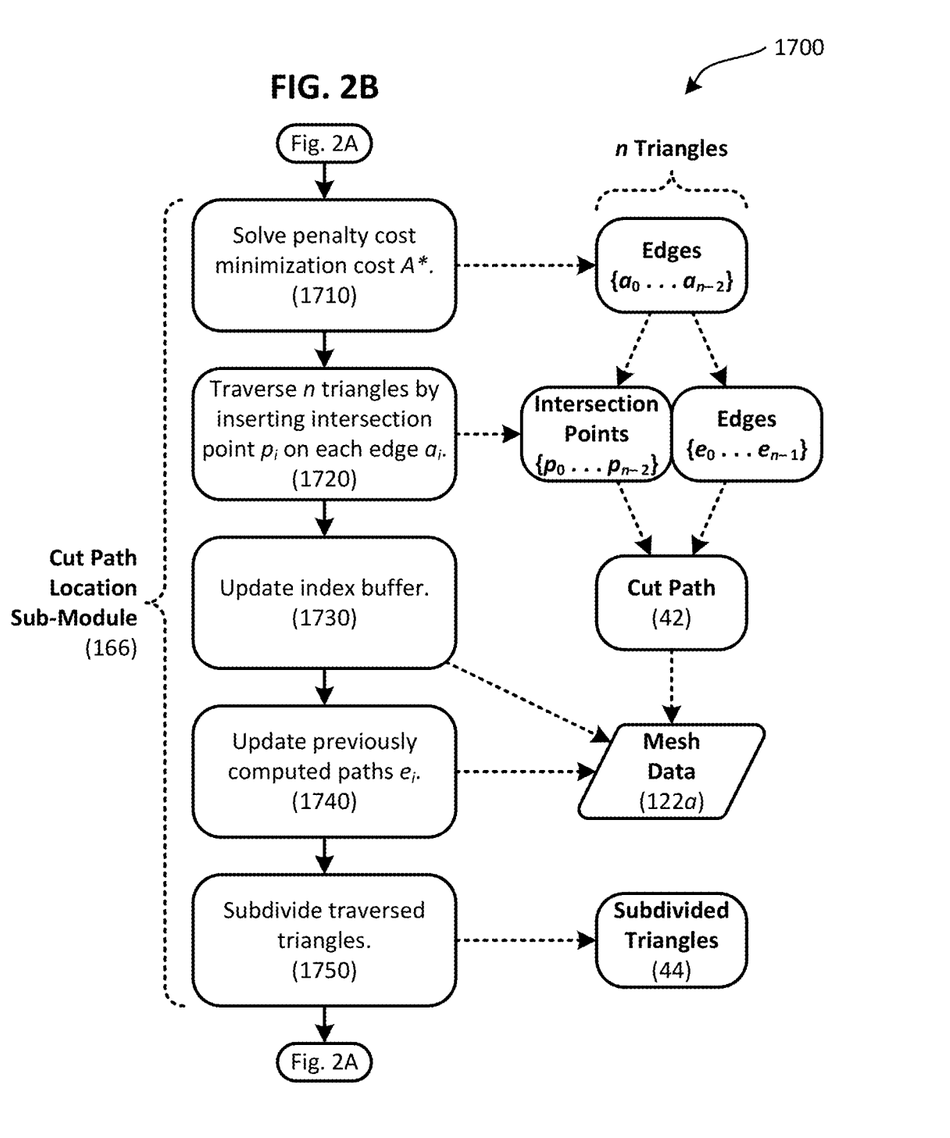
FIG. 2B is a flowchart illustrating an example method for locating a cut path between two intersecting vertices which are positioned on edges of marching cube face plane.

Once intersecting vertices 30 are located, cut path location sub-module 166 is further configured to locate cut path 42 between intersecting vertices 30. See reference numeral 1700 in FIG. 2A. FIG. 2B is a flowchart illustrating an example method 1700 for locating cut path 42 between two intersecting vertices 30 which are positioned on edges of marching cube face plane 22'. In certain embodiments method 1700 commences with finding a path between vertices 30 that reduces the deviation from marching cube face 22' and the path length. This can be accomplished by configuring cut path location sub-module 166 to solve a penalty cost minimization using A*, wherein the penalty cost has a first priority penalty on deviation from marching cube face 22', and a second priority penalty on path length. See reference numeral 1710 in FIG. 2B. In such embodiments the second priority penalty is considered only if the first priority penalty does not reveal a preferred cut path. For example, in one implementation a plurality of paths between intersecting vertices 30 are considered. If all of the considered paths deviate from marching cube face 22' equally, the path with the shortest length is chosen as cut path 42. Locating cut path 42 based on the penalty cost minimization using A* advantageously allows the three-dimensional mesh to be cut robustly, even in edge cases or other unique circumstances such as where the mesh comprises a large number of thin or zero-area polygons, or where polygons are completely or nearly parallel to marching cube faces 22'. Such unique circumstances can cause a path location technique that relies only on geometrical considerations to fail.

FIG. 3B schematically illustrates the results of solving penalty cost minimization function A* in the context of the three-dimensional triangular mesh of FIG. 3A. As illustrated, solving the penalty cost minimization using A* produces a sequence of n triangles extending between intersecting vertices 30. The n triangles can be represented as a sequence of edges $\{a_0, a_1, a_2, \ldots, a_{n-2}\}$, each of which is shared by two triangles. Cut path location sub-module 166 is configured to locate cut path 42 by traversing the sequence of n triangles and inserting an intersection point $p_i$ on each edge $a_i$. See reference numeral 1720 in FIG. 2B. The location of intersection points $p_i$, which intersect marching cube face plane 22', is provided by penalty cost minimization using A*. Cut path 42 can therefore be understood as the path that connects a first intersection point $V_0$ with a second intersection point $V_1$, and that passes through intermediate intersection points $\{p_0, p_1, p_2, \ldots, p_{n-2}\}$. As illustrated in FIG. 3B, cut path 42 comprises new edges $\{e_0, e_1, e_2, \ldots, e_{n-1}\}$.

Locating cut path 42 in triangular mesh 10 can therefore be understood as sequentially inserting an intersection point $p_i$ into each edge $a_i$. Intersection point $p_i$ represents a new vertex in the three-dimensional mesh, and therefore results in changes to mesh data 122a that represents the mesh. More specifically, modifying the mesh geometry results in changes to both a mesh index buffer and paths computed from the previous marching cube. Thus in one embodiment cut path location sub-module 166 is further configured to update an index buffer that forms part of mesh data 122a. See reference numeral 1730 in FIG. 2B. The previously computed paths $e_i$ can be updated as well. See reference numeral 1740 in FIG. 2B. Mesh data 122a can be updated after insertion of each vertex $\{p_0, p_1, p_2, \ldots, p_{n-2}\}$ in cut path 42. This can be accomplished with reference to the previously computed path in a dedicated data structure. One example of such a data structure are edge cut locations 124b stored in mesh repair cache 124. Thus in certain embodiments a separate data structure is used to store costs evaluated in the course of solving penalty cost minimization function A*, and/or sequentially determined edge cutting locations. Building such a separate data structure sequentially as marching cubes 22 are processed mitigates the memory cost associated with locating cut path 42.

The penalty cost minimization A* depends on mesh data 122a that defines the original mesh. In one implementation, mesh data 122a has a graph data structure. When a mesh repair operation is performed on the original mesh, the graph data structure has each polygon as a node, and each polygon edge as a graph edge. When the penalty cost minimization A* is applied, two cost values, a parent pointer, intersection point coordinates, and a core index are generated. Generating this data across the entire original mesh would have a significant memory cost. However, because the penalty cost minimization A* is applied only in a relatively small portion of the mesh—along the identified marching cubes—the memory cost is modest, as is the number of calculations used to locate the preferred cut path 42. It is therefore unnecessary to build the penalty cost minimization graph for the entire mesh; instead the graph data structure for A* can be generated on the fly as cut path 42 is located.

As noted previously, and as schematically illustrated in FIG. 3B, solving the penalty cost minimization function A* produces a sequence of edges $\{a_0, a_1, a_2, \ldots, a_{n-2}\}$ and a sequence of intersection points $\{p_0, p_1, p_2, \ldots, p_{n-2}\}$ that define cut path 42. In implementations wherein the three-dimensional polygon mesh comprises triangles, locating cut path 42 between intersection points $V_0$ and $V_1$ involves subdividing the traversed triangles so as to maintain the triangular mesh structure. See reference numeral 1750 in FIG. 2B. As illustrated in FIG. 3B, inserting new edge $e_0$ can be understood as resulting in the subdivision of the two original triangles $(V_0, V_{100}, V_{101})$ and $(V_{100}, V_{102}, V_{101})$. These original triangles become $(V_0, p_0, V_{101})$ and $(p_0, V_{102}, V_{101})$, respectively. New triangles $(V_0, V_{100}, p_0)$ and $(p_0, V_{100}, V_{102})$ are added. As disclosed previously, new edge $e_0$ can be stored in a separate data structure that is built sequentially as the cut path 42 is determined. The next edge that is to be traversed, $a_1$, was represented by half-edge $c_1$, which now points to new edge $(p_0, V_{102})$. Therefore, $a_1$ should be represented by the other half-edge, which is located at the corner opposite $c_1$, denoted by $c_{1.o}$. Insertion of new edge $(p_0, V_{102})$ results in the generation of two new subdivided triangles 44.

The foregoing triangle subdivision process, which operates on the solution produced by penalty cost minimization using A*, can be repeated to produce a subdivided triangle mesh and edge sequence $\{e_0, e_1, e_2, \ldots, e_{n-1}\}$ that is compatible with implicit surfaces 14. In particular, explicit surfaces 12 and implicit surfaces 14 correspond to each other along cut path 42, and therefore hybrid mesh generation sub-module 168 can be configured to connect these surfaces. See reference numeral 1800 in FIG. 2A. The result is a hybrid surface 50 that retains the geometry of the original mesh surface in regions where the mesh repair operation does not modify such geometry, but that adopts the repaired geometry of the implicit mesh surface in regions where defects were present in the original mesh. These explicit and implicit regions are connected together along cut path 42, thus resulting in a hybrid surface that represents the repaired original polygon mesh.

Figure 4A:
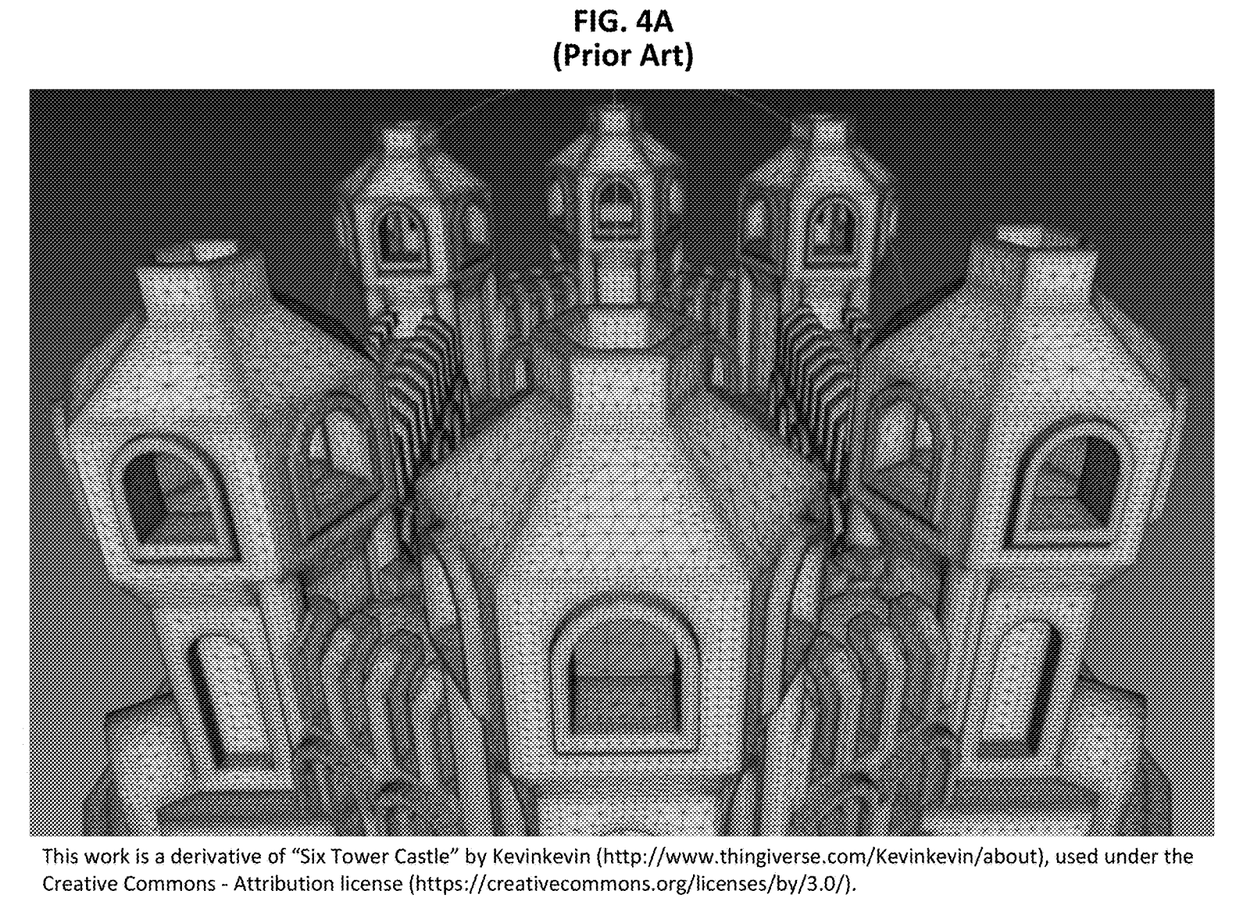
FIG. 4A illustrates the result of a mesh repair operation wherein the resulting mesh includes only implicit surfaces.
Figure 4B:
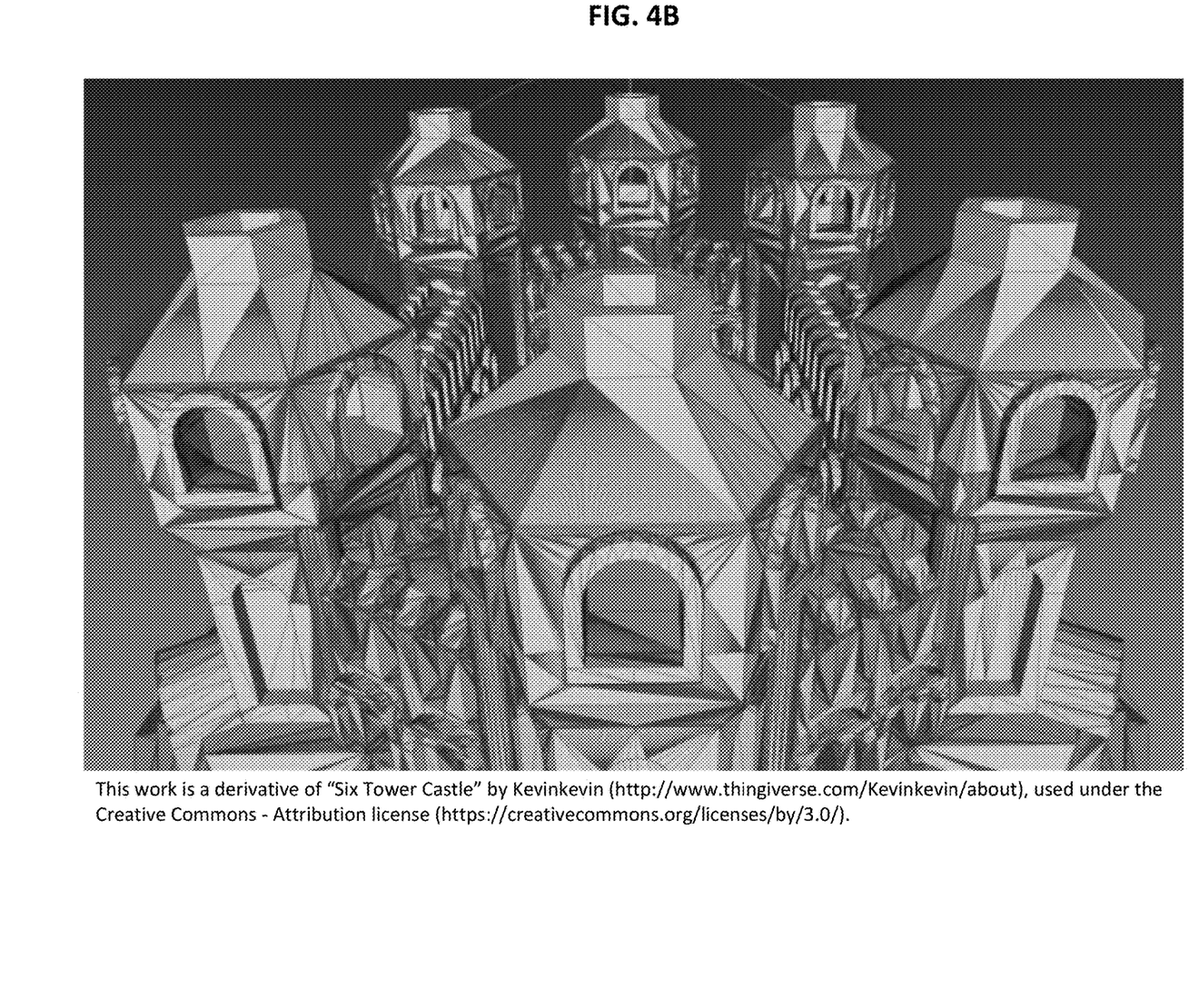
FIG. 4B illustrates the result of a mesh repair operation wherein the resulting mesh includes explicit surfaces and implicit surfaces joined together along a cut path.

Existing mesh repair solutions convert the discretized volumetric grid into a polygon mesh across the entire surface using an implicit re-meshing technique. While this global approach advantageously repairs defects in the original mesh, it also results in a loss of resolution and fine detail in regions where no defects were present in the original mesh. This is because the output mesh is constructed using only the distance information stored within the discretized volumetric grid. Processing the entire mesh in this fashion also increases the memory and processor capacity required to complete the operation in a time period that meets consumer expectations. Retaining the geometry of the original mesh in regions with no defects, or in regions where the mesh repair operation only negligibly or insubstantially changes the mesh geometry, addresses these concerns. In particular, the quality of the output mesh can be improved while still making the mesh repair operation faster and more efficient. For example, FIG. 4A illustrates the result of a mesh repair operation wherein the resulting mesh includes only implicit surfaces. In contrast, FIG. 4B illustrates the result of a mesh repair operation on the same input mesh wherein the resulting mesh includes explicit surfaces and implicit surfaces joined together along a cut path. As can be seen, the global approach undertaken in FIG. 4A results in the generation of fine triangular meshes over flat, feature-free surfaces, with a consummate loss of resolution corresponding to the resolution of the volumetric grid. FIG. 4B, on the other hand, retains large mesh elements in feature-free regions of the surface, thus retaining the geometry of the original mesh and also reducing the number of elements that need to be individually processed in the mesh repair operation. These and other advantages will be apparent from the disclosure provided herein.

Further Example Embodiments

Numerous variations and configurations will be apparent in light of this disclosure. For instance, one example embodiment provides a computer-implemented method for generating a repaired polygon mesh based on an original polygon mesh that includes at least one surface defect. The method comprises acquiring mesh data that defines the original polygon mesh. The method further comprises discretizing the original polygon mesh into a volumetric grid that comprises a plurality of volumetric elements that intersect the original polygon mesh. The method further comprises performing a mesh repair operation on the original polygon mesh to remove one or more of the surface defects. The method further comprises identifying a first subset of the volumetric elements as implicit based on results of the mesh repair operation. The method further comprises identifying a second subset of the volumetric elements that are marked as implicit, but that are adjacent to a volumetric element not marked as implicit. The method further comprises locating a cut path passing through the second subset of volumetric elements. The cut path separates an explicit region of the repaired polygon mesh from an implicit region of the repaired polygon mesh. In some cases acquiring the mesh data further comprises loading the mesh data from a storage repository. In some cases the method further comprises subdividing a subset of polygons that comprise the original polygon mesh, and that are traversed by the cut path. In some cases (a) acquiring the mesh data further comprises loading the mesh data from a storage repository; and (b) the method further comprises saving updated mesh data in the storage repository, wherein the updated mesh data defines a plurality of subdivided polygons having an edge along the cut path. In some cases (a) each of the plurality of volumetric elements corresponds to a surface segment of the original polygon mesh; and (b) the mesh repair operation processes each of the plurality of volumetric elements. In some cases volumetric elements encompassing a region of the original polygon mesh associated with one of the at least one surface defects are marked as implicit. In some cases the second subset of the volumetric elements defines a series of marching cubes that surround a cluster of volumetric elements in the first subset. In some cases the cut path is located based on a penalty cost minimization function having a first priority penalty on deviation of the cut path from a plane that defines one side of a particular volumetric element in the second subset. In some cases (a) the cut path is located based on a penalty cost minimization function having a first priority penalty of deviation of the cut path from a plane that defines one side of a particular volumetric element in the second subset, and a second priority penalty on cut path length; and (b) the second priority penalty is invoked only if the cut path cannot be located based on the first priority penalty alone.

Another example embodiment provides a polygon mesh defect repair system that comprises a storage device and a processor operatively coupled to the storage device. The processor is configured to execute instructions that are stored in the storage device. When executed, the instructions cause the processor to carry out a polygon mesh repair process. The polygon mesh repair process comprises loading, into the storage device, mesh data that defines a polygon mesh and a corresponding mesh geometry. The process further comprises performing a mesh repair operation on the polygon mesh using the processor. The process further comprises defining an explicit region of the polygon mesh. The mesh geometry in the explicit region is not substantially changed as a result of performing the mesh repair operation. The process further comprises defining an implicit region of the polygon mesh. The mesh geometry in the implicit region is modified as a result of performing the mesh repair operation. The process further comprises locating a marching cube that encompasses portions of both the explicit and implicit regions of the polygon mesh. The process further comprises locating a cut path that separates the explicit and implicit regions of the polygon mesh. The cut path is routed based on a penalty cost minimization function having a first priority penalty on deviation of the cut path from a plane that defines one side of the marching cube. In some cases the system further comprises a three-dimensional scanner, wherein loading the mesh data into the storage device comprises scanning a physical object using the three-dimensional scanner. In some cases the system further comprises a display device, wherein the polygon mesh repair process further comprises rendering a hybrid mesh on the display device, the hybrid mesh comprising the mesh geometry of the polygon mesh in the explicit region, and a modified mesh geometry produced by the mesh repair operation in the implicit region. In some cases the mesh repair operation includes a hole filling operation and a thickening operation. In some cases (a) the polygon mesh comprises a plurality of triangles; and (b) the polygon mesh repair process further comprises discretizing the polygon mesh into a volumetric grid that comprises a plurality of cubes that intersect the polygon mesh.

Another example embodiment provides a computer program product encoded with instructions that, when executed by one or more processors, causes a polygon mesh repair process to be carried out. The polygon mesh repair process comprises acquiring mesh data that defines a polygon mesh and a corresponding mesh geometry. The process further comprises performing a mesh repair operation on the polygon mesh using the one or more processors. The process further comprises defining an explicit region of the polygon mesh. The mesh geometry in the explicit region is not substantially changed as a result of performing the mesh repair operation. The process further comprises defining an implicit region of the polygon mesh. The mesh geometry in the implicit region is modified as a result of performing the mesh repair operation. The process further comprises locating a marching cube that encompasses portions of both the explicit and implicit regions of the polygon mesh. The process further comprises locating a cut path that separates the explicit and implicit regions of the polygon mesh. The cut path is routed based on a penalty cost minimization function having a first priority penalty on deviation of the cut path from a plane that defines one side of the marching cube. In some cases the polygon mesh repair process generates a hybrid mesh surface that includes the explicit and implicit regions of the polygon mesh. In some cases the polygon mesh repair process further comprises updating the mesh data to include a plurality of subdivided polygons having an edge along the cut path. In some cases (a) the polygon mesh comprises a triangle mesh; and (b) the cut path cuts across a plurality of triangles comprising the triangle mesh. In some cases (a) the polygon mesh comprises a triangle mesh having a plurality of triangle surfaces; and (b) locating the cut path further comprises subdividing a subset of the triangle surfaces, wherein a subdivided triangle surface includes an edge that runs along the cut path. In some cases (a) the polygon mesh repair process further comprises identifying first and second intersecting vertices, each of which correspond to points where the polygon mesh intersects an edge of the marching cube face; and (b) the cut path extends between the first and second intersecting vertices. In some cases the penalty cost minimization function is applied only to portions of the polygon mesh within the marching cube.

The foregoing detailed description has been presented for the purposes of illustration and description. It is not intended to be exhaustive or to limit the invention to the particular disclosed embodiments. Many modifications and variations are possible in light of this disclosure. Thus it is intended that the scope of the invention be defined not by this detailed description, but rather by the claims appended hereto.

What is claimed is:

1. A computer-implemented method for generating a repaired polygon mesh based on an original polygon mesh that includes at least one surface defect, the method comprising:
    acquiring mesh data that defines the original polygon mesh;
    discretizing the original polygon mesh into a volumetric grid that comprises a plurality of volumetric elements that intersect the original polygon mesh;
    performing a mesh repair operation on the original polygon mesh to remove one or more of the surface defects and produce a repaired polygon mesh;
    identifying as implicit a first subset of the volumetric elements that intersect a portion of the repaired polygon mesh resulting from the mesh repair operation;
    identifying a second subset of the volumetric elements that are identified as implicit, but that are adjacent to a volumetric element not identified as implicit; and
    locating a cut path passing through the second subset of volumetric elements, wherein the cut path separates an explicit region of the repaired polygon mesh from an implicit region of the repaired polygon mesh.

2. The method of claim 1, wherein acquiring the mesh data further comprises loading the mesh data from a storage repository.

3. The method of claim 1, further comprising subdividing a subset of polygons that comprise the original polygon mesh, and that are traversed by the cut path.

4. The method of claim 1, wherein:
    acquiring the mesh data further comprises loading the mesh data from a storage repository; and
    the method further comprises saving updated mesh data in the storage repository, wherein the updated mesh data defines a plurality of subdivided polygons having an edge along the cut path.

5. The method of claim 1, wherein:
    each of the plurality of volumetric elements corresponds to a surface segment of the original polygon mesh; and
    the mesh repair operation processes each of the plurality of volumetric elements.

6. The method of claim 1, wherein volumetric elements encompassing a region of the original polygon mesh associated with one of the at least one surface defects are identified as implicit.

7. The method of claim 1, wherein the second subset of the volumetric elements defines a series of marching cubes that surround a cluster of volumetric elements in the first subset.

8. The method of claim 1, wherein the cut path is located based on a penalty cost minimization function having a first priority penalty on deviation of the cut path from a plane that defines one side of a particular volumetric element in the second subset.

9. The method of claim 1, wherein:
    the cut path is located based on a penalty cost minimization function having a first priority penalty of deviation of the cut path from a plane that defines one side of a particular volumetric element in the second subset, and a second priority penalty on cut path length; and
    the second priority penalty is invoked only if the cut path cannot be located based on the first priority penalty alone.

10. A polygon mesh defect repair system that comprises a storage device and a processor operatively coupled to the storage device, the processor configured to execute instructions that are stored in the storage device, and that, when executed, cause the processor to carry out a polygon mesh repair process that comprises:
    loading, into the storage device, mesh data that defines a polygon mesh and a corresponding mesh geometry;
    performing a mesh repair operation on the polygon mesh using the processor;
    defining an explicit region of the polygon mesh, wherein the mesh geometry in the explicit region is not substantially changed as a result of performing the mesh repair operation;
    defining an implicit region of the polygon mesh, wherein the mesh geometry in the implicit region is modified as a result of performing the mesh repair operation;
    locating a marching cube that encompasses portions of both the explicit and implicit regions of the polygon mesh; and
    locating a cut path that separates the explicit and implicit regions of the polygon mesh, wherein the cut path is routed based on a penalty cost minimization function having a first priority penalty on deviation of the cut path from a plane that defines one side of the marching cube.

11. The system of claim 10, further comprising a three-dimensional scanner, wherein loading the mesh data into the storage device comprises scanning a physical object using the three-dimensional scanner.

12. The system of claim 10, further comprising a display device, wherein the polygon mesh repair process further comprises rendering a hybrid mesh on the display device, the hybrid mesh comprising the mesh geometry of the polygon mesh in the explicit region, and a modified mesh geometry produced by the mesh repair operation in the implicit region.

13. The system of claim 10, wherein the mesh repair operation includes a hole filling operation and a thickening operation.

14. The system of claim 10, wherein:
the polygon mesh comprises a plurality of triangles; and
the polygon mesh repair process further comprises discretizing the polygon mesh into a volumetric grid that comprises a plurality of cubes that intersect the polygon mesh.

15. A non-transitory computer readable medium encoded with instructions that, when executed by one or more processors, causes a polygon mesh repair process to be carried out, the process comprising:
acquiring mesh data that defines a polygon mesh and a corresponding mesh geometry;
performing a mesh repair operation on the polygon mesh using the one or more processors;
defining an explicit region of the polygon mesh, wherein the mesh geometry in the explicit region is not substantially changed as a result of performing the mesh repair operation;
defining an implicit region of the polygon mesh, wherein the mesh geometry in the implicit region is modified as a result of performing the mesh repair operation;
locating a marching cube that encompasses portions of both the explicit and implicit regions of the polygon mesh; and
locating a cut path that separates the explicit and implicit regions of the polygon mesh, wherein the cut path is routed based on a penalty cost minimization function having a first priority penalty on deviation of the cut path from a plane that defines one side of the marching cube.

16. The non-transitory computer readable medium of claim 15, wherein the penalty cost minimization function is applied only to portions of the polygon mesh within the marching cube.

17. The non-transitory computer readable medium of claim 15, wherein the polygon mesh repair process generates a hybrid mesh surface that includes the explicit and implicit regions of the polygon mesh.

18. The non-transitory computer readable medium of claim 15, wherein the polygon mesh repair process further comprises updating the mesh data to include a plurality of subdivided polygons having an edge along the cut path.

19. The non-transitory computer readable medium of claim 15, wherein:
the polygon mesh comprises a triangle mesh; and
the cut path cuts across a plurality of triangles comprising the triangle mesh.

20. The non-transitory computer readable medium of claim 15, wherein:
the polygon mesh comprises a triangle mesh having a plurality of triangle surfaces; and
locating the cut path further comprises subdividing a subset of the triangle surfaces, wherein a subdivided triangle surface includes an edge that runs along the cut path.

* * * * *